United States Patent [19]

Dethlefs

[11] 4,091,558
[45] May 30, 1978

[54] HOOKSETTER

[76] Inventor: David H. Dethlefs, 4117 NE. 10th Pl., Renton, Wash. 98055

[21] Appl. No.: 730,665

[22] Filed: Oct. 7, 1976

[51] Int. Cl.$^2$ .......................................... A01K 91/06
[52] U.S. Cl. ...................................................... 43/15
[58] Field of Search ................... 43/15, 16, 19, 18, 25

[56] References Cited

U.S. PATENT DOCUMENTS

| | | | |
|---|---|---|---|
| 2,657,492 | 11/1953 | Skorr | 43/15 |
| 2,776,514 | 1/1957 | Kinder | 43/16 |
| 2,799,111 | 7/1957 | Voboril | 43/15 |
| 2,810,981 | 10/1957 | Littau | 43/16 |
| 3,867,779 | 2/1975 | McMaster | 43/15 |
| 3,943,650 | 3/1976 | Johansson et al. | 43/15 |

*Primary Examiner*—Louis G. Mancene
*Assistant Examiner*—Robert P. Swiatek

[57] ABSTRACT

The hooksetter comprises a loading line, a positioning line which are fabricated from monofilament strands, and a trip assembly which operating with the positioning line and the loading line are operable to restrain a fishing pole in a tensioned configuration. The trip assembly includes a tab by which the assembly is connected to the positioning line and thus to the base portion of the fishing rod, and a trip arm which is carried by the tab which is releasably secured to the loading line and thus to the outer tip of the fishing rod, another portion of the trip arm carrying fishing line. Tension on the fishing line causes the trip arm to articulate with respect to the cord formed by the position and loading lines, thereby permitting the trip arm to release from the loading line and thus to permit the fishing pole to flex abruptly and thus "set" the hook.

8 Claims, 5 Drawing Figures

HOOKSETTER

FIELD OF INVENTION

The present invention relates to fishing and angling apparatus, and more particularly to an automatic hooksetter for fishing poles.

BACKGROUND OF THE INVENTION

The substantial part of the skill in angling involves the task of "setting the hook" once the fish has taken the bait. This task requires much experience and a lightness of touch which not all persons have. Bells, electricsignals, and other warning means have been offered to provide the fisherman with greater notice of the presence of a fish. These signals, however, do nothing involved in the manipulation of pole and line which would set a hook. Crude and complex pole holders and ferrule retainers have been offered in the art to raise the likelihood of hooking a fish which has become interested in a lure; these structures have been commercially unacceptable.

Accordingly, it is an object of the present invention to provide a hooksetter mechanism which may employ a natural behavior of a fishing pole and a fishing line which is responding to a fish to provide an accurately timed jerking mechanism which may set the hook.

it is a further object of this invention that the present device operate in the environment of a conventional fishing pole and line without substantially complicating or encumbering the conventional apparatus.

It is a further object of this invention that the underlying concepts of the present invention be adaptable to various fishing pole and lure combinations, and thus be adaptable to a variety of fishing conditions.

It is still another object to provide the aforesaid fishing lure in the environment fishing pole which provides the characteristics of tubular flex by mechanical means.

These and other objects shall become apparent from the description following, it being understood that modifications may be made without affecting the teachings of the invention here set out.

SUMMARY OF THE INVENTION

The hooksetter comprises a loading line, a positioning line which are fabricated from monofilament strands, and a trip assembly which operating with the positioning line and the loading line are operable to restrain a fishing pole in a tensioned configuration. The trip assembly includes a tab by which the assembly is connected to the positioning line and thus to the base portion of the fishing rod, and a trip arm which is carried by the tab which is releasably secured to the loading line and thus to the outer tip of the fishing rod, another portion of the trip arm carrying fishing line. Tension on the fishing line causes the trip arm to articulate with respect to the cord formed by the position and loading lines, thereby permitting the trip arm to release from the loading line and thus to permit the fishing pole to flex abruptly and thus "set" the hook.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
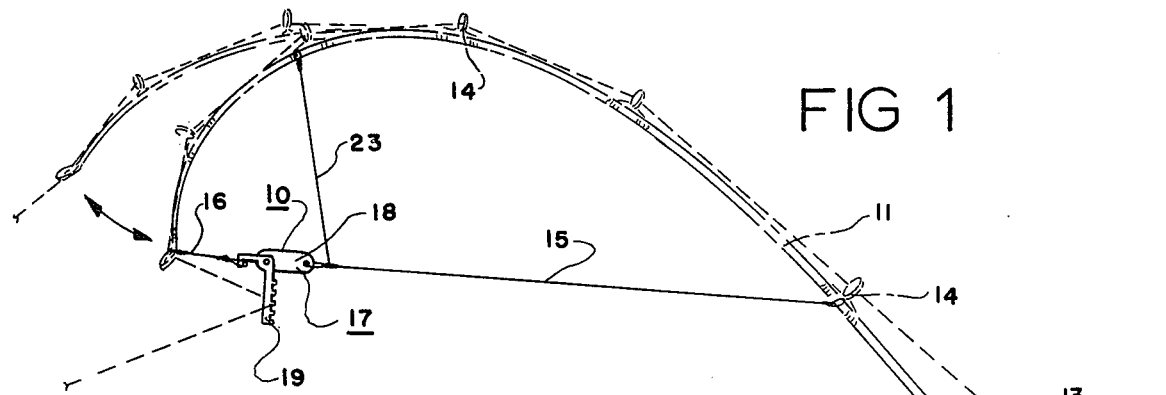
FIG. 1 is a side elevational view of the Hooksetter of the present invention shown in the environment of a conventional fishing pole which is drawn in broken lines for illustrative purposes.

Referring now to the drawings, more particularly to the FIG. 1, the hooksetter of this invention is shown to advantage and generally identified by the numeral 10. The hooksetter 10 is intended to operate in the environment of a conventional fishing rod 11 having a reel 12 which in turns carries and controls fishing line 13. The fishing rod 11 is an elongated tubular structure having a handle 11' at one of its terminal ends and a plurality of ferules 14 disposed at intervals along its length to control the line 13.

The hooksetter comprises a positioning line 15, a pole loading line 16, and a trip assembly 17. The line 15 is intended to provide a means of connection between the assembly 17 and a suitable point on the rod 11. The line 16 is intended to be the connection between an active component of the assembly 17, hereinafter described, and the terminal end of the rod 11. As viewed in the FIG. 1, the lines 15 and 16 define a geometrical cord which in the loaded position of the rod 11 holds the rod 11 in a curved or flexed position. Thus, the line 15 provides the spacing which positions the assembly 17 at a predetermind close position to the terminal end of the rod 11.

Figure 2:
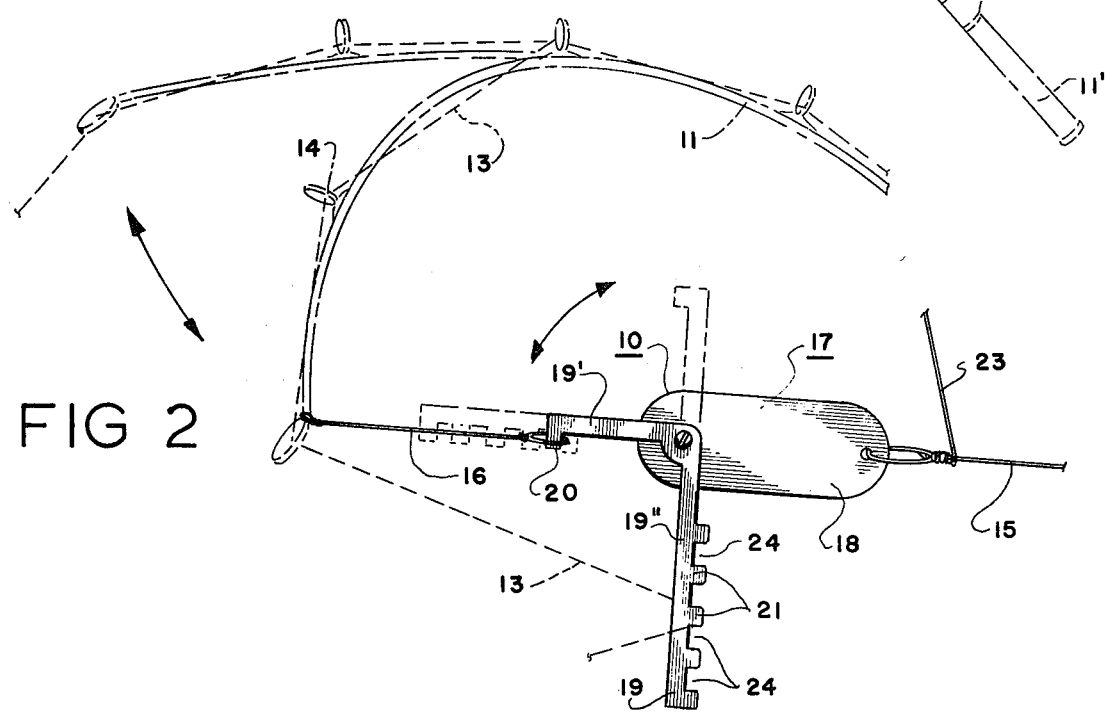
FIG. 2 is a fragmentary side elevational view taken from the FIG. 1 and drawn to a larger scale.

Referring to the FIG. 2, the release assembly 17 comprises a connecting tab 18 and a trip arm 19. The tab 18 is an elongated member which provides the base on which the active trip arm 19 pivots, and by which the assembly 17 is connected to the line 15, and thus the rod 11.

The trip arm 19 is an L-shaped member pivotally mounted at the vertex of its legs to the tab 18. The trip arm 19 has a shorter let 19' and a longer leg 19". The arm 19 is oriented with the shorter arm 19' disposed forwardly with respect to the pole 11, and the longer leg 19" being disposed generally downward. The leg 19' is provided with a hook portion which issues downwardly, or on the interior side of the L-shaped arm 19. The arm 19" is provided with a one or more hook shaped portions 21 which issue from the exterior side of the leg 19'. It has been found to advantage to provide a plurality of hook portions 20 and 21 at intervals on the respective legs 19' and 19" to permit the resistance with which the hooksetter 10 is triggered to be selectively altered. The general rule is that as hook portions 20 become more displaced from the pivot p9int of the arm 19, resistance becomes greater. The rule with hook portions 21 on the leg 19" is the reverse: hook portions 21 being less displaced from the point of pivot of the arm 19 provide more resistance. It is to be understood that while square profiled hook portions 20 and 21 are shown in the drawings, other configurations, such as chisel-tooth configurations, shown in FIG. 3, may be used to advantage.

As shown in the FIGS. 1 and 2, the hooksetter 10 is loaded by engaging the hook portion 21 with the loading line 16, and simultaneously looping the fishing line 13 over a hook portion 21. Tension produced by a fish on the fishing line 13 results in rotation of the arm 19 with respect to the tab 18, which further causes the hook portion 20 to be disengaged from the line 16 and then from line 13 from the portion 21. As shown more clearly in FIG. 1, it has been found to advantage to provide a safety means which ensures that the hooksetter 10 will not recoil to either follow the fishing rod 11 or strike the user. Such a restraining means may include a line 23 which is fabricated of an elastomeric material or monofilament, and which is fastened between a suitable portion of the fishing rod 11 and the tab 18. When the hooksetter 10 releases, the lines 15 and 23 hold the hooksetter 10 in a suspended position.

Figure 3:
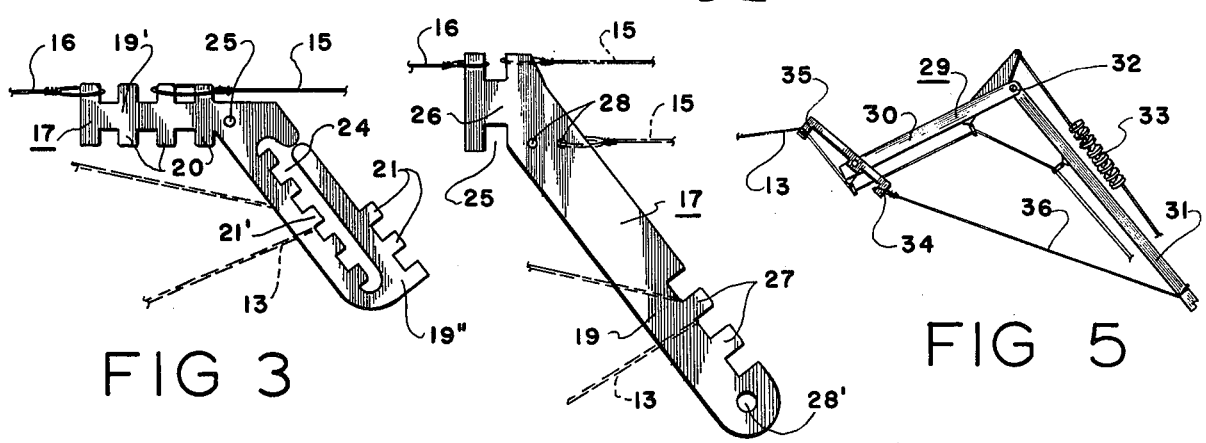
FIG. 3 is a further embodiment of the present Hooksetter.

Referring to the FIG. 3, a further embodiment of the hooksetter 10 obviates the problem of recoil solved by the line 23. The trip assembly 17 is fabricated of a integral unit wherein a trip arm is fabricated with legs 19' and 19" and a plurality of hook portions 20 and 21 operating substantially as described above. In the further embodiment, hook portions 21 project from both the upper and lower sides of the leg 19'. The leg 19" is provided with an elongated slot 24 having a plurality of hook sections 21' disposed on its interior side with respect to the vertex of the legs 19' and 19". A further set of hook portions 21' may be disposed on the exterior side of the leg 19" in the manner of the hook portions 21 described above. In operation, the line 16 is connected to an adjacently disposed hook section 21 as described above. The line 15 is connected to a hook section projecting from the end of the leg 19' adjacent to line 15. The fishing line 13 is looped through the slot 24 and over one of the hook sections 21'. In operation, tension on the line 13 releases both of the lines 15 and 16. The line is then permitted to slide down and be carried to provide an aperture through one of the walls of the leg 19" to the slot 24. Ends of the aperture kiss to restrict passage of line 13 therethrough.

It has also been found to advantage to provide a hole 25 in a preselected position in the vertex of the legs 19' and 19" through which the line 15 may be tied. This structure substantially reduces the calculation required to properly set the hooksetter 10.

Figures 4, 5:
FIG. 4 is a still further embodiment of the present Hooksetter.
FIG. 5 is a further embodiment of the present Hooksetter adapted to operate on a fishing pole which operates by mechanical equivalent of tubular flex.

Referring to the FIG. 4, the further embodiment of the present invention employs a trip assembly 17 wherein the trip arm 19 is an elongated member having a hook shaped portion 26 at one of its terminal ends, a plurality of hook portions 27 disposed generally at the end opposite the portion 26, a hole 28' adjacent the apertures 25, and one or more holes 28 disposed at the end adjacent the hook portion 25. In operation, the line 16 is hooked over the portion 25, and the line 15 may either be hooked over the opposing portion of the hook portion 26 or be tied at the holes 28. The fishing line is then hooked over 27 and threaded around the portion 27. Operation is substantially as described above.

Referring to the FIG. 5, the present invention is particularly well adapted to fishing poles which operate by mechanical equivalence of tubular flex. One such pole 29 employs rigid portions 30 and 31, connected by hinges 32 and being held with a predetermined resistance by various arrangements of springs 33. The hooksetter 10 may be pivotally mounted at the terminal end of the outermost portion 30 of the mechanical pole 29. The hooksetter 10 is an elongated member having a pair of hook portions 34 and 35 at each of its respective terminal ends, with the point of mounting of the present embodiment of the hooksetter 10 being midway in its length. A loading line 36 is connected between an interior section 31 of the rod 29 and the interior hook portion 34 in the manner of the lines 15 and 16 described above. The fishing line 13 of the rod 29 is hooked over the outer hook portion 35 which customarily is carried in superimposed fashion over the terminal end of the outer section 30. In operation, tension on the line 13 results in rotation of the hooksetter 10 which unloads the connection of the line 36 with the hook portion 35.

It has been found that releasing forces of four ounces results in jerk forces of three pounds. In the mechanical rod 29, jerk loads may be substantially increased.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A hooksetter to be used in combination with a fishing rod including a fishing line comprising:
   a loading line connected at one of its terminal ends to the tip of said fishing rod;
   a positioning line which is connected at one of its terminal ends to a point close to the base position of said fishing rod;
   a trip assembly having means releasably securing with the free terminal ends of said loading line and said positioning line to form a linear cord which retains said fishing rod in a flexed configuration, said trip assembly further including means engaging said fishing line which is disposed subjacently and rearwardly of said means securing said loading line and said positioning line, said trip assembly comprises a connecting tab which is secured to the free end of said positioning line, and a trip arm which is a substantially L-shaped member pivotally mounted at the end of said tab opposite said positioning line, and said trip arm being an inverted L-shaped member having a hook portion on one of its legs providing said means securing said loading line and wherein the opposing leg of said trip arm includes a hook portion providing said means engaging said fishing line.

2. The hooksetter of claim 1 wherein said leg carrying said hook portion securing said fishing line a plurality of said hook portions for engaging said fishing line.

3. A hooksetter to be used in combination with a fishing rod including a fishing line, comprising:
   a loading line connected at one of its terminal ends to the tip of said fishing rod;
   a positioning line which is connected at one of its terminal ends to a point close to the base portion of said fishing rod;
   a trip assembly having means releasably securing with the free terminal ends of said loading line and said positioning line to form a linear cord which retains said fishing rod in a flexed configuration, said trip assembly further including means engaging said fishing line which is disposed subjacently and rearwardly of said means securing said loading line and said positioning line, said trip assembly is fabricated as the single unit wherein one of a terminal ends of said trip assembly is provided with a pair of first hook portions providing said means engaging said loading line and said positioning line, and wherein the end of said trip assembly opposite said first hook portion is provided with second portions engaging said fishing line.

4. The hooksetter of claim 3 wherein said trip assembly has a hole disposed in close proximity to said second hook portions carrying said fishing line.

5. The apparatus of claim 3 wherein said trip assembly has a hole therein disposed in close proximity to said first hook portions.

6. The hooksetter of claim 5 wherein a plurality of said first hook portions are provided in said trip assembly.

7. The hooksetter of claim 3 wherein an elongated slot is provided in said trip assembly foward side of said slot being provided with said second hook portions securing said fishing line.

8. The hooksetter of claim 7 wherein an aperture is provided in the rearward side of said trip assembly through which said fishing line may pass into said slot.

* * * * *